Dec. 3, 1968   D. A. FOGG   3,414,331

VALVE FOR AIR FILM CONVEYORS

Filed Feb. 9, 1967   2 Sheets-Sheet 1

INVENTOR.
DANIEL A. FOGG
BY *Price, Heneveld,
Huizenga & Cooper*
ATTORNEYS

Dec. 3, 1968 D. A. FOGG 3,414,331
VALVE FOR AIR FILM CONVEYORS
Filed Feb. 9, 1967 2 Sheets-Sheet 2

INVENTOR.
DANIEL A. FOGG
BY Price, Heneveld,
Huizenga & Cooper
ATTORNEYS

United States Patent Office 3,414,331
Patented Dec. 3, 1968

3,414,331
VALVE FOR AIR FILM CONVEYORS
Daniel A. Fogg, White Cloud, Mich., assignor to Rapistan Incorporated, Grand Rapids, Mich., a corporation of Michigan
Filed Feb. 9, 1967, Ser. No. 614,928
7 Claims. (Cl. 302—29)

ABSTRACT OF THE DISCLOSURE

A valve to be used in the openings through the platen of an air film conveyor, which valve, by means of air pressure differential, automatically substantially shuts off the flow of air through the valve when no article is super-imposed over and obstructs the discharge end of the valve. The valve is of the normally open type and closes in response to an increase in the pressure differential between the valve's discharge end and the air chamber. The valve includes a bypass bleed passage to reduce the air pressure differential to that which will cause the valve to open when the valve's discharge is obstructed.

Background of the invention

This invention is an improvement in air film conveyors and tables. This equipment utilizes a film of air to lift and support the articles above a surface so that they may be readily moved while so supported. The specific invention deals with the nozzles through which the air is discharged beneath the articles to form the air film.

Air film conveyors and tables, as such, including a platen having a plurality of holes arranged in a pattern through which air is discharged from a plenum chamber or other source to form a film beneath the articles to be transported is old in the art. This type of conveyor is illustrated in the patent to Willis Jr. 2,805,898 dated Sept. 10, 1957, and the patent to Wallin et al. 2,848,820 issued Aug. 26, 1958. The concept of incorporating a valve into the air discharge orifice to stop air discharge through those orifices over which no article is super-imposed is also known in the art, as is shown in the patent to Willott 3,268,265 issued Aug. 23, 1966.

The particular objective of this invention is to provide a valve having a minimal structure which will automatically close when no article is super-imposed above the orifice and automatically open when an article is so super-imposed. The valve is designed to operate in response to changes in the pressure differential between the pressure to which the inlet portion of the valve is subjected within the plenum chamber and the pressure within that portion of the valve itself which is in open communcation with the valve discharge orifice. Because air film conveyors require a large number of orifices it is essential that the valve be kept both simple and operationally dependable. Otherwise the system becomes so expensive that its use is uneconomical except for a few highly specialized applications. Another objective to provide a valve which does not require the article's weight to open it against the bias of the plenum chamber air or a spring or, as in some constructions, both of these forces.

Summary of the invention

The invention is a valve molded of a resilient flexible material designed to be mounted in the orifice of an air-film conveyor and having a tubular portion extending into the air supply plenum chamber. The shape of this tubular portion creates a passageway extending through the valve and the resilience of the material forming the walls of this tubular portion bias the walls apart, thus keeping this passageway open when the air pressure within the plenum chamber and that within the passageway are within a predetermined differential range. This will occur when the discharge of the air through the discharge end of the valve is partially obstructed such as occurs when an article is superimposed over this orifice When, however, the orifice is unobstructed the air pressure within the passageway drops so that the differential between the pressure within the passageway and that within the plenum chamber exceeds this predetermined differential and the air pressure of the plenum chamber collapses the the walls to close the air receiving end of the passageway. The valve incorporates a bleed passageway which never closes, permitting a very small quantity of air to enter the passageway at all times. This permits the air pressure in the passageway to build up when the discharge of air from the valve is obstructed thus reducing the differential to the point where the walls of the passageway will separate and the valve will be open.

Description of the preferred embodiments

Figure 1:
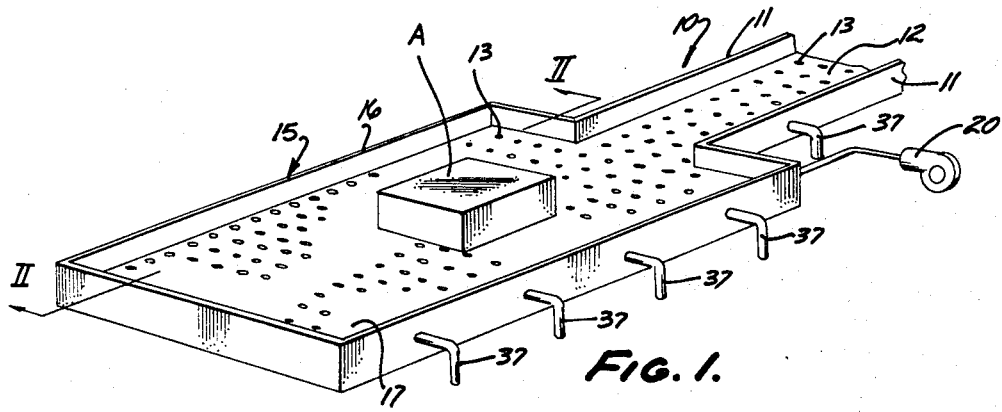
FIG. 1 is a fragmentary, oblique view of an air film conveyor and table equipped with this invention.

FIG. 1, in combination, illustrates both a conveyor and a table of the air film type. The conveyor is indicated by the numeral 10 and consists of a frame 11, the sides of which are connected by both a conveyor bed member or platen 12 of a suitably rigid material and a bottom closure plate (not illustrated). Beneath the platen 12 is a plenum chamber (not illustrated) similar to the plenum chamber under the bed of the air table. The platen 12 has a plurality of small orifices 13 of sufficient number and arranged in the pattern such that air under pressure emerging from these orifices 13 will form a continuous film under an article overlying the platen 12 raising it from the platen 12 sufficiently that the article will be totally supported by the film and thus will move while so supported.

Figure 2:
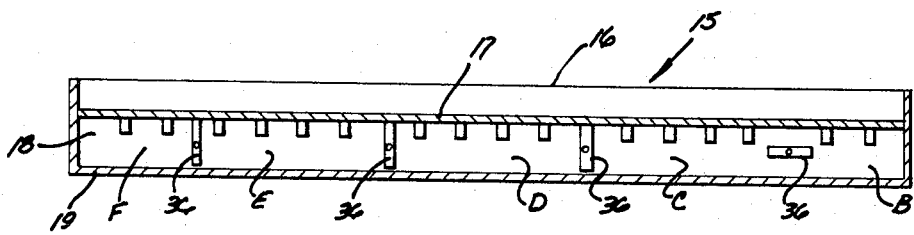
FIG. 2 is a sectional elevation view taken along the plane 22 of FIG. 1.

Connected to the conveyor 10 is an air table 15 surrounded by a frame 16 and having a rigid bed plate or platen 17. The platen 17 is perforated with numerous orifices 13 which, like the orifices of the conveyor, are arranged in a sufficient quantity and pattern to form an air film beneath articles such as the article A, super-imposed over the platen. Beneath the platen 17 is a plenum chamber 18 closed on its lower side by a plate 19 (FIG. 2). Air is supplied to the plenum chamber under pressure from a suitable source such as the blower 20 (FIG. 1). All of the foregoing structure is conventional in the art of air film conveyors and tables and is described here only to provide a background for the hereinafter described invention.

Figure 3:
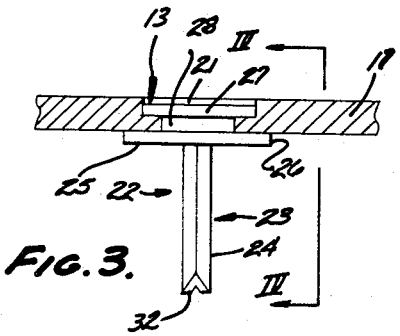
FIG. 3 is an enlarged, fragmentary, sectional elevation view of one of the valves.
Figure 4:
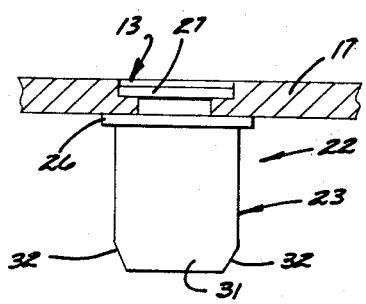
FIG. 4 is an enlarged, fragmentary, sectional view taken along the plane IV—IV of FIG. 3.

The air discharge nozzles or orifices 13 are more particularly illustrated in FIGS. 3 and 4. Each consists of a neck opening which connects the plenum chamber 18 with the counterbore 21 through which air passing through the orifice discharges at the surface of the conveyor. Each of the orifices 13 is equipped with a valve member 22. This valve member forms the subject matter of this invention.

Each of the valve members has a valve body 23, the lower or stem portion of which is formed by a tube 24 and the upper portion by a mounting head 25. The mounting head 25 consists of a stop flange 26 and an anchor flange 27 separated by a neck portion 28. The anchor flange 27 is of substantially lesser diameter than the stop flange 26 and the neck portion 28 is of lesser diameter than the anchor flange 27. The thickness of the neck portion 28 is such that the valve can be inserted from the bottom through the neck opening with the anchor flange 27 holding the valve against downward displacement and the stop flange 26 anchoring the valve against upward displacement under the air pressure within the plenum chamber 18. The body of the valve 22 is molded of a resilient flexible material which permits it to be deformed for installation in the manner just described.

Figure 8:
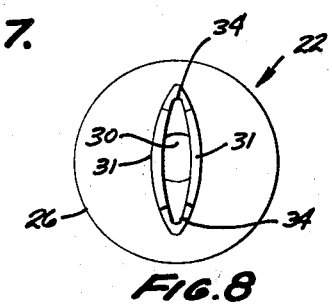
FIG. 8 is a bottom end view of one of the valves with the passage open.

The stem or tube 24 projects downwardly into the plenum chamber 18 and, in cross section, has the general shape of a biconvex lens. It is so manufactured that the resiliency of the material biases the walls of the tube apart to form an interior passage 30 (FIGS. 5, 6, 7, and 8) which communicates through the valve from one end to the other. The lower end of the tube terminates in a pair of valve flaps 31 formed by the chamfers 32, one on each side of the valve (FIG. 6). In the form of the invention illustrated in FIGURES 3, 4, 6, 7, 8 and 9, the walls 33 of the tube are joined by a small radius 34 (FIG. 8). In this particular form of the invention, this radius is functionally important, as will be explained in connection with the operation of this valve.

The plenum chamber 18 of the air table 15 is also equipped with starter gates 36 dividing the plenum chamber into zones B, C, D, E, and F illustrated in FIG. 2. Each of the starter gates is pivotally mounted to rotate from a vertical or closed position to a horizontal or open position. These may be operated automatically or manually as illustrated. In the case of manual operation, the gates are equipped with handles 37. The same arrangement is used in the conveyor 10 but in this case, since the width of a conveyor is substantially less than that of the table, the spacing of the gates may be greater. The gates are simply blocks largely isolating one zone from another, the purpose of which will be explained under operation.

The operation of this invention is as follows. When the conveyor is inoperative, the air pressures inside and outside the plenum chamber 18 are balanced. In this condition, the resilient walls 33 of the tube 24 of the valve are held apart by their natural bias and the passageway 30 through the valve is open. To initiate operation, the starter gates 36 are all rotated to closed position, thus, isolating the zones B, C, D, E, and F from each other. Assuming that the blower 20 is introducing air into the Zone B, the pressure in this zone will be built up first. The rate at which the air can escape through the valves 22 communicating with this zone of the plenum chamber is substantially less than the rate at which the blower 20 is delivering air to the chamber. Thus, the pressure in the chamber will rise.

Since the air within the passage 30 of each of the valves will be free to escape through the top opening of the valve, the pressure inside this passage will be significantly less than the pressure within the plenum chamber 18. When the differential between the pressure of the air surrounding the tube 24 exceeds the air pressure within the passage 30 by a predetermined amount, the valve flaps' 31 resistance to deflection will be overcome and they will be forced together. This substantially closes the lower end of the passage 30.

The closure of the valves effects a substantial economy in operation of this type of conveyor. Normally only a minor portion of the surface of either an air table or a conveyor is covered with articles. Shutting off the air flow through those of the orifices which are not actually in use materially reduces both the required blower capacity and the operating cost of the equipment.

Figure 10:
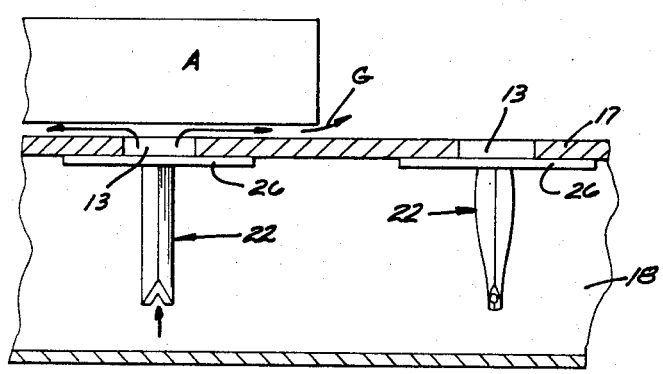
FIG. 10 is an enlarged, fragmentary, sectional view illustrating both the operation of the valves and a slightly modified valve construction.

The air flow through the valve 22 is not entirely shut off by the closing of the flaps 31 because the radii 34 at each side will prevent the walls from making contact at these points. Thus, two very small bleed orifices 40 (FIG. 9) will remain open. These will continue to bleed air from the plenum chamber 18 into the passage 30 but at so reduced a rate, that no pressure rise will occur in the passage 30 unless the escape of this air is materially restricted. If an article moves over the discharge end of the valve, the restriction will quickly be such that the air escape rate is less than the air flow capacity of the bleed orifices 40. This will cause the pressure in the passage 30 to rise to a point where the natural bias of the walls 33 will cause the flaps 31 to open. This is illustrated in FIG. 10 whereas the arrows G indicate the restricted movement imposed by the article seated over a valve 22.

Figure 5:
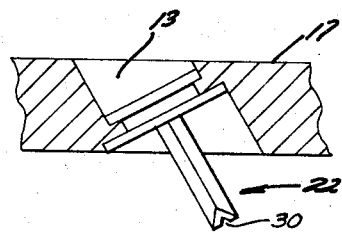
FIG. 5 is an enlarged, fragmentary sectional elevation view of a modified mounting for one of the valves.
Figure 6:
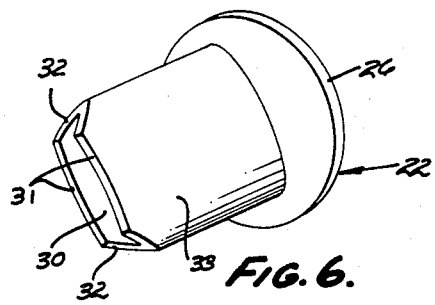
FIG. 6 is an oblique view of one of the valves.
Figure 7:
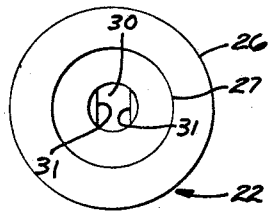
FIG. 7 is a plan view of one of the valves.

FIG. 5 illustrates the valve 22 mounted at an angle in the platen of the conveyor to give a directional component to the air as it is discharged. This will impart some limited directional bias to the articles being transported on the air film.

FIGS. 11 through 14 illustrate a modification of this invention in which the valves are formed as an integral part of a continuous sheet. The sheet 50 and the stems or tubes 51 forming the valves are molded together simultaneously as an integral unit. Each sheet 50 will have a number of the tubular stems 51 projecting from one face with each one having a suitable orifice 52 through the sheet. The complete sheet can then be secured by any suitable means such as adhesive bonding to the bottom face of a rigid platen 53. The latter is equipped with orifices 54 arranged in a pattern to align with the orifices 52 of the valves.

Figure 13:
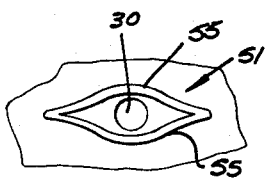
FIG. 13 is a fragmentary, bottom end view taken along the plane XIII—XIII of FIG. 12.
Figure 9:
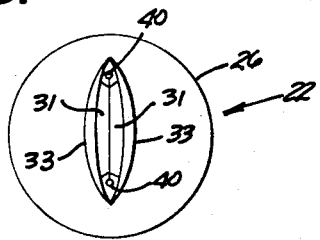
FIG. 9 is a view similar to FIG. 8, showing the passage closed.
Figure 12:
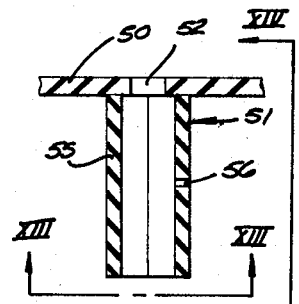
FIG. 12 is a fragmentary sectional elevation view taken along the plane XII—XII of FIG. 11.
Figure 11:
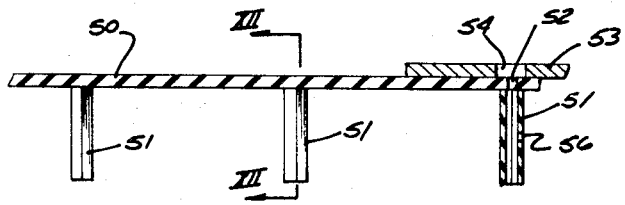
FIG. 11 is a fragmentary, sectional, elevation view showing a modified form of this invention.
Figure 14:
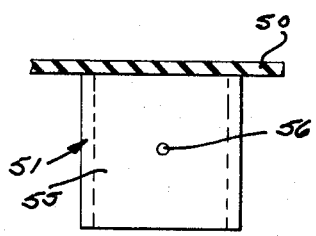
FIG. 14 is a fragmentary elevation view taken along the plane XIV—XIV of FIG. 12.

The valves 51 are of a somewhat modified construction as is shown in FIGS. 12, 13, and 14. In this construction, the cross-sectional shape of the tube is such that the ends of the sidewalls 55 come together in a convergent V-shape without the radii 34 illustrated in FIG. 8. In this case, the sides of the passage will not remain open to form the bleed orifices 40. Thus, a separate bleed orifice 56 is provided in one of the sidewalls of the passageway at a point which assures its continued communication with the discharge opening at the top of the valve when the sidewalls are closed by excessive pressure differential. The basic function of this form of the valve is identical to that of the valves illustrated in FIGS. 1 through 7.

FIG. 10 illustrates a slightly different modification. In this case the valves are individually molded, but without the neck portion and the anchor flange. The valves are individually bonded to the under surface of the platen by the anchor flange 26.

In the manufacture of this valve, it has been found that a suitable material for the valve is a 75 durometer rubber, molded with a valve sidewall thickness of 0.075 inch. Experimentation has shown that this invention is operative when the valves are molded of a rubber-like material having a durometer in the range of 60–90 with sidewall thickness varying from 0.060 to 0.100 inch. It will be recognized that the lower durometer value and the thinner the sidewalls of the tube, the more sensitive the valve will be to pressure differential changes with the thinner walled, more flexible material being more suitable for the conveying and handling of small, lightweight articles.

In a platen for an air table measuring four feet by eight feet, 495 valves (approximately sixteen per square foot) were provided. A blower having a capacity of approximately 750 c.f.m. provided an operating pressure within the plenum chamber of approximately thirty inches of water. The valves were designed to close when the pressure within the passageway dropped to twenty-six inches of water. A pressure differential of approximately 4 inches of water has been found to be a very satisfactory pressure differential range for effecting the opening and closing of the valve of this invention. If either of the bleed orifices 40 or 56 have an air flow capacity greater than that necessary to cause the valve to react to open condition reasonably rapidly upon obstruction of the discharge orifice, then the valve unit has largely lost its purpose because it is not sufficiently restricting the discharge of air from the plenum chamber. When this occurs the capacity of the blower 20 must be increased correspondingly.

It will be obvious that as the article A is moved across the air table 15 or along the air film conveyor 10, it will cause those valves 22 which are immediately beneath the article to open, and as it moves from one area to another the valves will open as the article restricts or obstructs the free discharge of the air from orifices beneath it. At the same time, those valves which become unobstructed as the article moves away, immediately close. Thus, on both the conveyor and the air table, only a very minute volume of air is lost through those valves over which there is no article; a significant volume of air flows through only those valves or orifices which are actually working in the support and transport of articles. This is the significant functional result of this invention. This permits the system to work with much smaller capacity blowers and a much smaller volume of air. It will be recognized that while the term "air" is used throughout this description, the film forming medium may be any gas—since under some specialized circumstances the use of a particular gas may be necessary.

While several embodiments of this invention have been described, it will be recognized that other modifications may be made without departing from the principles of this invention. Such of these modifications as incorporate the principles of this invention are to be considered as included in the hereinafter appended claims, unless these claims, by their language, expressly state otherwise.

I claim:

1. A flow control member for air film conveyors and tables having a gas discharge opening at one end and a gas receiving opening at the other end connected by a tubular body having a central passage therethrough; a valve having walls for controlling the flow of gas between said openings, said valve being biased to open when the gas pressure differential between the gas within the valve passageway and the gas in contact with the exterior of said walls falls below a predetermined range; a constantly open gas bleed by-passing said valve and having sufficient gas flow capacity to reduce the gas pressure differential between said ends of said openings into said predetermined range and cause said valve to open only when said gas discharge opening of said control member is substantially obstructed.

2. A flow control member as described in claim 1 wherein the walls surrounding said passage are an elongated tube of resilient flexible material, said walls being biased into spaced relationship holding said passage open; the bias of said walls being sufficient to sustain them in spaced relationship when gas can freely flow through the discharge opening of said control member.

3. A flow control member as described in claim 2 wherein said tube has a cross-sectional shape generally that of a biconvex lens with the walls of said tube joined along the sides of said tube.

4. A flow control member as described in claim 3 wherein the central portion of the walls of said tube project beyond the side portions thereof at said gas receiving opening, said projecting central portions of said walls forming valve flaps; said walls at each of said sides being joined about a radius and forming a pair of gas bleed orifices when said valve flaps are closed, by-passing said closed flaps.

5. A flow control member as described in claim 3 wherein the walls of said tube at the gas receiving end thereof deflect to press against each other closing said end when said gas pressure differential exceeds the predetermined range; an air bleed orifice through one of said tube walls communicating with said passage between said closed end and said gas discharge opening.

6. An air film conveyor or air table having a gas plenum chamber and a platen forming the top thereof, said platen being equipped with a plurality of gas discharge openings through which gas is discharged for forming the air film, the improvement in said conveyor comprising providing each of said discharge openings with a flow control member as described in claim 1 for regulating the flow of gas therethrough.

7. An air film conveyor or air table as described in claim 6 wherein gates are provided within said plenum chamber for dividing it into a plurality of zones, separate air supply means connected to each of said zones, and means operative when air is first introduced to the plenum chamber for opening said gates one by one to interconnect said zones in sequence as the differential in air pressure in adjacent zones is increased so that the pressure in adjacent zones insufficient to close said valves thereby permitting a lower volume of air to be used to make the conveyor or air table operative.

References Cited

UNITED STATES PATENTS

| | | | |
|---|---|---|---|
| 1,971,853 | 8/1934 | Ihlefeldt | 302—31 |
| 2,785,928 | 3/1957 | Hanson | 302—29 |
| 3,081,886 | 3/1963 | Flexman et al. | 302—29 |
| 3,279,863 | 10/1966 | Bouladon et al. | 302—29 |
| 3,283,920 | 11/1966 | Schonfelder et al. | 214—1 |

ANDRES H. NIELSEN, *Primary Examiner.*